(12) United States Patent
Oliver

(10) Patent No.: US 8,006,008 B2
(45) Date of Patent: Aug. 23, 2011

(54) APPARATUS AND METHOD FOR DATA PROCESSING HAVING AN ON-CHIP OR OFF-CHIP INTERCONNECT BETWEEN TWO OR MORE DEVICES

(75) Inventor: Richard Oliver, Fulwood (GB)

(73) Assignee: Arm Limited, Cambridge (GB)

( * ) Notice: Subject to any disclaimer, the term of this patent is extended or adjusted under 35 U.S.C. 154(b) by 976 days.

(21) Appl. No.: 11/892,297

(22) Filed: Aug. 21, 2007

(65) Prior Publication Data
US 2008/0084862 A1 Apr. 10, 2008

(30) Foreign Application Priority Data
Oct. 5, 2006 (GB) .................................. 0619726.3

(51) Int. Cl.
*G06F 5/00* (2006.01)
*G06F 15/16* (2006.01)
(52) U.S. Cl. .......................... 710/62; 709/248
(58) Field of Classification Search ...................... 710/62
See application file for complete search history.

(56) References Cited

U.S. PATENT DOCUMENTS

| | | | | |
|---|---|---|---|---|
| 4,916,411 A | * | 4/1990 | Lymer ............................ | 331/25 |
| 5,038,365 A | * | 8/1991 | Belloc et al. .................. | 375/222 |
| 5,040,193 A | * | 8/1991 | Leonowich et al. .......... | 375/333 |
| 5,070,474 A | * | 12/1991 | Tuma et al. .................... | 703/24 |
| 6,556,152 B2 | * | 4/2003 | Pitio et al. ..................... | 341/101 |
| 6,738,821 B1 | | 5/2004 | Wilson et al. | |
| 2001/0007577 A1 | | 7/2001 | Measor | |
| 2005/0210177 A1 | * | 9/2005 | Norden ........................ | 710/317 |
| 2005/0231399 A1 | | 10/2005 | Fowler et al. | |

FOREIGN PATENT DOCUMENTS

EP  1 134 668 A2  2/2006

OTHER PUBLICATIONS

GB Search Report for GB0619726.3 dated Feb. 12, 2007.
United Kingdom Examination Report, Oct. 29, 2010, for Great Britain Application No. 0619726.3.

\* cited by examiner

*Primary Examiner* — Henry W Tsai
*Assistant Examiner* — Juanito C Borromeo
(74) *Attorney, Agent, or Firm* — Nixon & Vanderhye P.C.

(57) ABSTRACT

A data processing apparatus is provided with multiple devices. These devices generate parallel signals using a parallel signal protocol. A serializing circuit captures a set of parallel signals, serializes them to form a serial stream of data and transmits this serial stream of data. A deserializing circuit at a destination device receives this serial stream of data, deserializes this serial stream of data to form a second set of parallel signals corresponding to the first set of parallel signals and then applies this second set of parallel signals to the destination device.

44 Claims, 7 Drawing Sheets

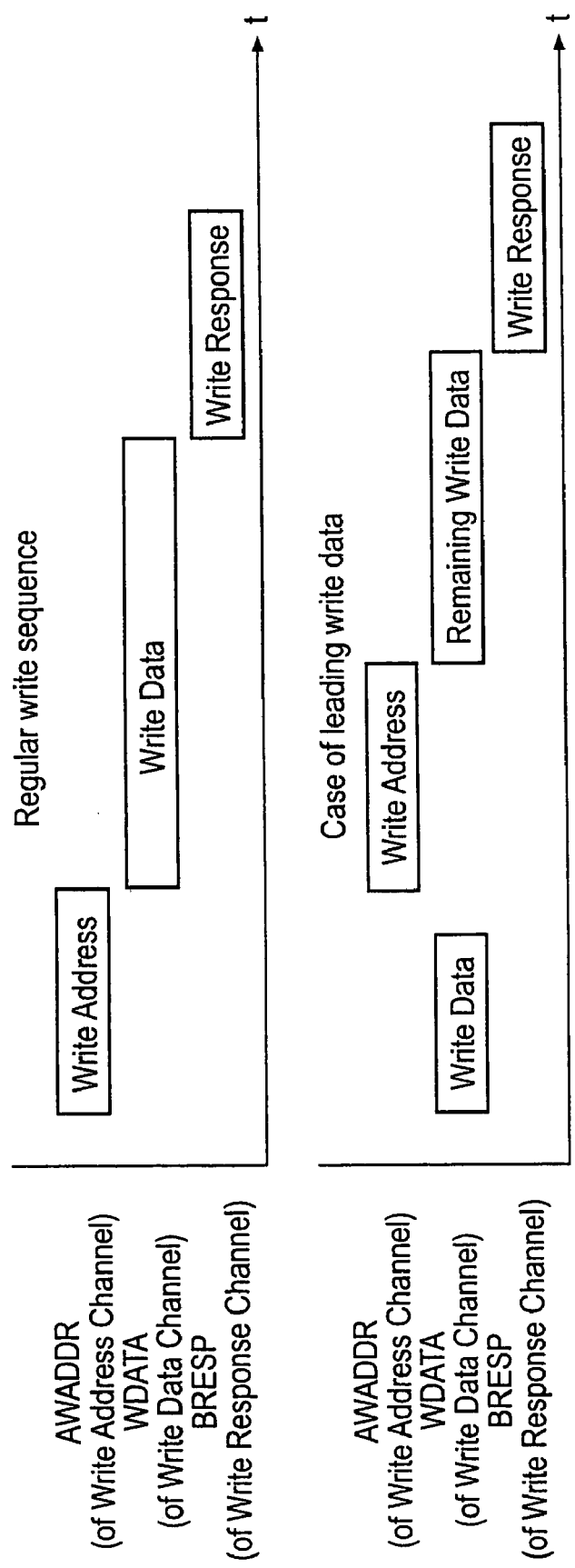
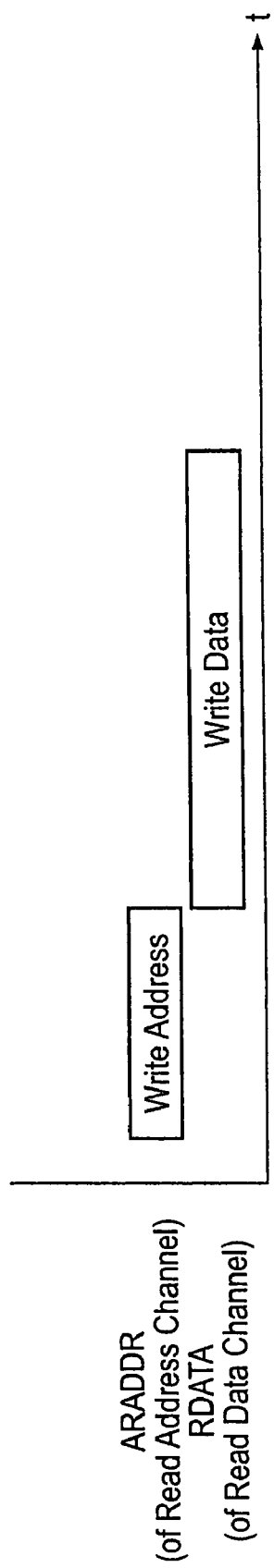
Fig. 6
Fig. 7

APPARATUS AND METHOD FOR DATA PROCESSING HAVING AN ON-CHIP OR OFF-CHIP INTERCONNECT BETWEEN TWO OR MORE DEVICES

TECHNICAL FIELD

The technology described in this application relates to the field of interconnecting devices of data processing systems.

Background

It is known to provide integrated circuits with two or more devices thereon between which it is desired to pass signals using an interconnect. This type of integrated circuit is becoming increasingly common and increasingly complex, such as so-called "system-on-chip" integrated circuits. One known technique for interconnecting the multiple devices on these integrated circuits is to use AXI interconnects of the type designed by ARM Limited of Cambridge, England. These AXI interconnects are parallel-based interconnects providing point-to-point communication between devices. Problems facing such interconnects includes the desire to increase the bandwidth capability while reducing the power and area overhead associated with the interconnect and lowering pin-count at interfaces. Increasing the bandwidth capability of a parallel-based interconnect can be achieved by widening the data path. However this increases gate count with an associated increase in power consumption, and a reduced ability to maintain timing and performance requirements when the design is synthesized. The interface has also more signals to route and connect.

A further difficulty with existing interconnects is that the highest bandwidth device typically determines the datawidth and bandwidth requirements. However, not all the point-to-point communication channels on the integrated circuit require this maximum design bandwidth. One way of dealing with this is to place slower devices into a separate domain that is accessed through a frequency adapting bridge. However, this increases latency, which can be particularly problematic for some devices, such as interrupt controllers.

As an example of the above, consider an AXI interface where the datawidth, user width and IDwidth is 32-bits, 8-bits and 8-bits respectively. In this case the number of signals on such an AXI interface is 266. Changing the data width to 64-bits so as to increase the bandwidth in turn increases the total number of signals to 334. In order to support a 128-bit datawidth the signal count reaches 470 signals. These large numbers of signals needed to support wide datawidths for a high bandwidth have a direct impact upon the required silicon surface area.

There are known various technologies for connecting different separate discrete components within electronic systems. These known systems include PCI EXPRESS, StarFabric, SerialLite and SPI. These known interconnect technologies are highly specific to their intended application and are unsuitable for efficient use with the AXI protocol.

SUMMARY

Viewed from one aspect the technology described in this application provides an apparatus for data processing comprising:
two or more devices each having parallel signal interface operating in accordance with a parallel signal protocol;
an interconnect coupled to said two or more devices and operating to pass signals therebetween; wherein
said interconnect comprises:
a serializing circuit coupled to a parallel signal interface of a first device of said two or more devices and a serial data path and configured:
(i) to sample from said parallel signal interface of said first device a first set of parallel signals forming a transaction in accordance with said parallel signal protocol;
(ii) to serialize said first set of parallel signals to form a serial stream of data; and
(iii) to transmit said stream of data via said serial data path; and
a deserializing circuit coupled to a parallel signal interface of a second device of said two or more devices and said serial data path and configured:
(i) to receive said serial stream of data from said serial data path;
(ii) to deserialize said serial stream of data to form a second set of parallel signals corresponding to said first set of parallel signals; and
(iii) to apply said second set of parallel signals to said parallel signal interface of said second device to reform said transaction in accordance with said parallel signal protocol.

The inventor recognized that the parallel signal interface of two or more devices can be sampled in accordance with an existing parallel signal protocol and then serialised and deserialised so as to provide communication, but over a much narrower signal path. The signals to be passed are sent in accordance with the parallel signal protocol of the devices, then converted to a serial form before being reformed into parallel signals in accordance with the original parallel signal protocol. From the point of view of the devices, which maybe legacy devices which have already been designed, tested and verified, the use of the technology described in this application can be substantially transparent with the serialising and the deserialising being performed within the interconnect by the serialising circuit and the deserialising circuit.

Whilst it is possible that unidirectional communication may be appropriate in some conditions, a more usual and generally useful arrangement is one in which each of the two or more devices has serialising circuit and a deserialising circuit thereby permitting bi-directional communication.

Using the serialising circuit and the deserialising circuit to capture and then reform the signals in accordance with the parallel signal protocol allows integrated circuits to be formed with mixed interconnect mechanisms, i.e. some of the devices communicate purely by parallel connections, whilst other of the devices utilise the serialising circuit and the deserialising circuit to provide a narrower serial data path for communication. This enables the potential bandwidth constricting problems of a serial data path to be avoided for particular point-to point communication paths requiring the highest bandwidth since these can maintain a dedicated wide parallel interconnect without the overhead associated with that wide parallel interconnect being born by all of the connections on the integrated circuit.

In the case where more bandwidth is required from the serial data path, but in which the full parallel native data path is not necessary, a plurality of serial data channels can be used to transmit the serial stream of data. These need not always be active at any given point-point communication, rather they could be selectively activated when a device was communicating with another device which required that higher bandwidth connection justifying the activation of more than one serial data channels.

Whilst it will be appreciated that the second set of parallel signals reformed may not be exactly the same as the first set of parallel signals, e.g. certain redundant information for a particular target maybe be omitted, in preferred example embodiments these signals will be identical for at least some point-to-point communication paths on the integrated circuit so as to provide a high degree of transparency in the use of the present technique.

The serialising circuit may advantageously reduce the amount of serial data to be transmitted by identifying one or more predetermined patterns of values for signals within the first set of parallel signals and representing these one or more patterns with corresponding short codes. The short codes can then be recognised within the deserialising circuits to reform the corresponding patterns of values. This technique exploits the recognition that certain patterns of values will be more common than others and justify the provision of short codes therefore, as well as the circuitry necessary to code and decode in accordance with the short codes. Short codes need not be used for all transactions and a "full mode can be provided with transactions past unaltered. In this way an unusual transaction for which no short codes are provided can still be transmitted and received.

The short codes typically represent one or more transaction characterising control parameters, such as a length of transaction, a size of data value to be transmitted, a number of data values to be transmitted, a burst mode specifier, a destination base address tag, an offset from a catalogued address or an incremental address for the transaction.

A further refinement is that the serialising circuit and the deserialising circuit have a difference mode in which the serial data stream represents a sequence of the first set of parallel signals by representing the differences therebetween. This compresses the data to be transmitted.

The power consumption of the integrated circuit as a whole can be reduced when one or more of the serialising circuit and the deserialising circuit include a power down controller responsive to a detected period of inactivity to power themselves down and responsive to a received signal from another device upon the serial data path to power themselves up.

The noise immunity of the serial data stream can be improved by the use of techniques such as differential signaling and parity bits to detect bit errors.

Physical timing properties of the on-chip serial data path can be improved by the use of techniques such as embedding the clock into the data stream through Manchester encoding. Manchester encoding is only one example of a technique which can be used in this way. Alternatively, the serialising circuit and the deserialising circuit can conveniently comprise respective local oscillators that are subject to synchronisation by the serial data stream itself. Local oscillators may be necessary due to high frequencies associated with serial data transmission to meet bandwidth requirements and due to problems with global clock distribution in the physical layout of the integrated circuit. Parity bits within the serial stream, or modulation of the serial data stream, can provide embedded synchronisation points for the local oscillators. The serialising circuit and the deserialising circuit can also be arranged to generate and exchange synchronisation signals so as to perform closed loop timing control (i.e. asynchronous operation) as an artifact of circuit switched communications.

High speed serial data transmission can be prone to generating large amounts of radio frequency interference. This can be reduced by imposing a jitter to the serial data clock rate so as to spread the electromagnetic emissions to be of a lower intensity and over a wider frequency spectrum.

The flexibility and usefulness of the technology described in this application is enhanced when the serialisation circuit and the deserialisation circuit include respective buffer memories for buffering a plurality of transactions to be subject to serialisation together to form a chain of serial data representing a plurality of transactions. As an example, a whole stream of data values may share common characteristics and accordingly these characteristics need only be sent once followed by a sequence of serial data representing various data values.

The serialising circuit and the deserialisation circuit providing point-to-point communications can operate in a circuit switched mode whereby the serialising circuit and the deserialising circuit generate and exchange handshake signals so as to establish serial data path there between.

The serialising circuit broadcasts either the full or short-coded destination address of a transaction as an initiation step that seeks to establish a serial data path with the appropriate deserialising circuit and then the appropriate deserialising circuit can issue an acknowledgement signal back as a handshake signal establishing the serial data path if the destination address is mapped to that deserialising circuit. The transaction can be cancelled and an error reported if the address does not map to anything.

The technology described in this application can be used on-chip, e.g. with SoC designs, or off-chip, e.g. between integrated circuits to reduce pin count.

Viewed from another aspect the technology described in this application provides a method of operating an apparatus for processing data having two or more devices each having parallel signal interface operating in accordance with a parallel signal protocol and an interconnect coupled to said two or more devices and operating to pass signals therebetween, said method comprising the steps of:

sampling from a parallel signal interface of a first device of said two or more devices a first set of parallel signals forming a transaction in accordance with said parallel signal protocol;

serializing with a serializing circuit said first set of parallel signals to form a serial stream of data;

transmitting said stream of data via a serial data path;

receiving said serial stream of data from said serial data path;

deserializing with a deserializing circuit said serial stream of data to form a second set of parallel signals corresponding to said first set of parallel signals;

applying said second set of parallel signals to a parallel signal interface of a second device of said two or more devices to reform said transaction in accordance with said parallel signal protocol.

The above, and other objects, features and advantages will be apparent from the following detailed description of illustrative embodiments which is to be read in connection with the accompanying drawings.

BRIEF DESCRIPTION OF THE DRAWINGS

FIG. 6 is a timing diagram for a parallel write transaction; and

FIG. 7 is a timing diagram for a parallel read transaction.

DESCRIPTION OF THE NON-LIMITING, EXAMPLE EMBODIMENTS

Figure 1:
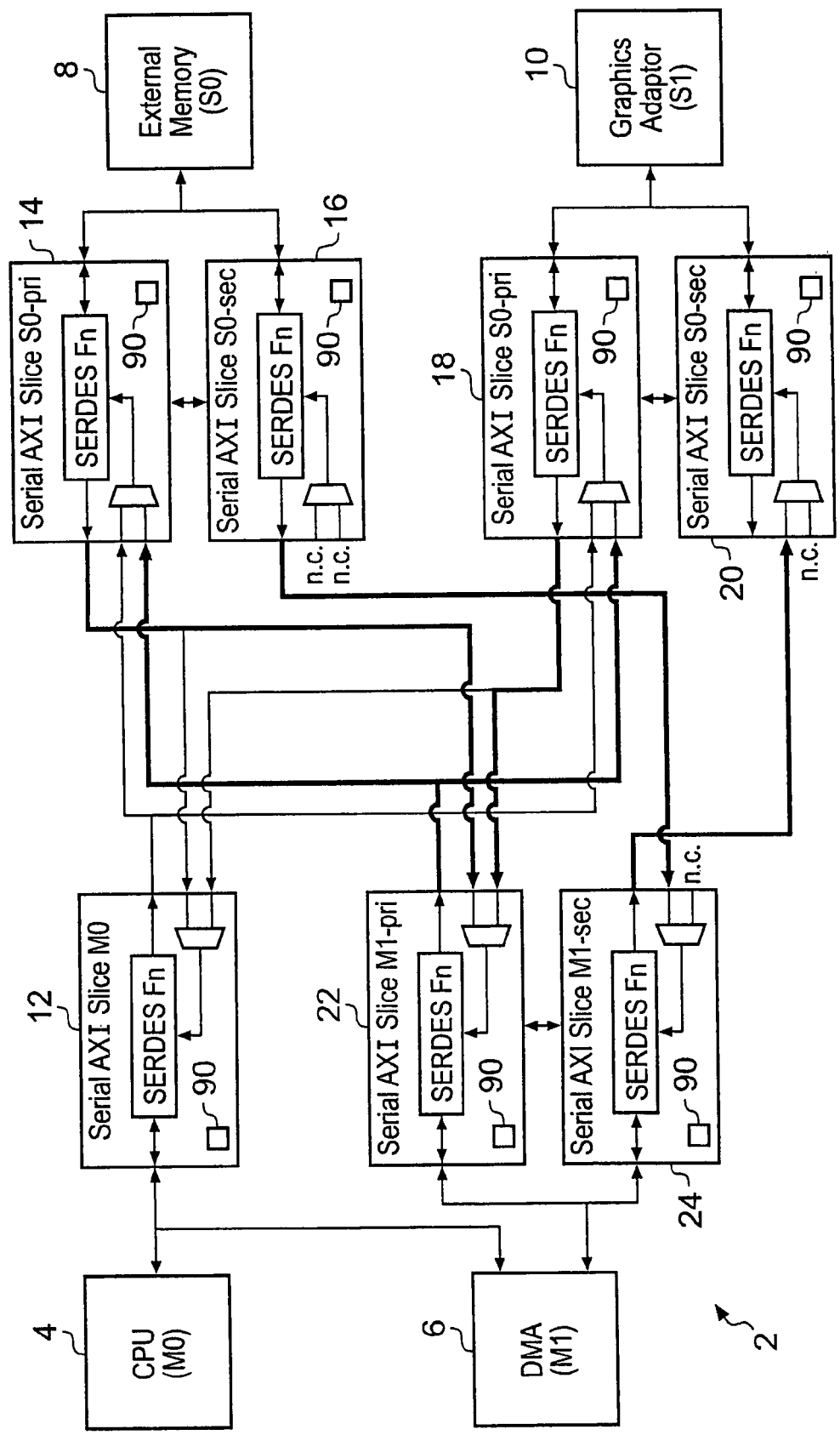
FIG. 1 schematically illustrates an integrated circuit comprising multiple devices connected via serialising and deserialising circuits in a pure serial interconnect.

FIG. 1 illustrates an integrated circuit 2 incorporating multiple devices in the form of a central processing unit (CPU) 4, a direct memory access (DMA) unit 6, an external memory 8 and a graphics adapter 10. The CPU 4 and the DMA 6 are master devices. The external memory 8 and the graphics adapter 10 are slave devices. Each of the devices 4, 6, 8, 10 has a parallel signal interface in the form of an AXI interface operating in accordance with the AXI parallel signal protocol. The interconnect between these devices 4, 6, 8, 10 is provided by respective serial communication units 12, 14, 16, 18, 20, 22, 24, which each include both a serialising circuit and a deserialising circuit. The point-to point bandwidth requirements between the DMA 6 and the graphics adapter 10, or external memory 8, are such that two serial data channels are required for these communications and accordingly two serial communication units are provided in association with each of these high bandwidth requirement devices. Conversely, the CPU 4 only requires a single serial channel and accordingly a single serial communication unit 12 is required. In operation, the devices 4, 6, 8, 10 generate sets of parallel signals in accordance with the AXI protocol at their signal interfaces. The relevant connected serial communication unit 12-24 then captures the parallel signals, serialises the serial signals, and transmits them over a serial data path. The receiving device receives the serial signals from the serial data path and reforms the set of parallel signals, either exactly or in a form in which redundant information is no longer present since it was not transmitted in the serial data, before these reformed sets of parallel signals are applied to the destination device. Each of the serial communication units 12-24 can include a local oscillator 90 which is capable of resynchronisation by techniques such as using parity bits as synchronisation markers within the serial data, modulating the serial data clock rate, exchanging synchronisation signals so as to provide closed loop timing control or other synchronisation methods. Alternatively, the clock can be embedded into the serial data stream through Manchester encoding (Manchester encoding is a non-limiting example). The serial signals themselves can use differential transceivers and parity bits so as to make their transmission more robust.

When a master device, such as the CPU 4, transmits a transaction it generates parallel signals at its interface which are captured by the associated serial communication unit 12. Some of these signals will indicate the target address. The serial communication unit 12 then broadcasts a signal over the serial connection to each of the deserialising circuits associated with the other devices and waits for an acknowledgement. If the target address is valid, then the deserialising circuit which is mapped to the address range of the transaction concerned will respond by asserting and returning an acknowledgement signal via the return serial data path, otherwise the serialising circuit must cancel the transaction and return an address decode error to the master. If the acknowledgement signal is received, it will then be used to select the associated return data channel as the channel to be used for the point-to-point communication. Multiplexers (these elements can be more generally considered to be channel selectors and may, for example, be provided in the form of an OR gate) associated with the receiving portions of each of the serial communication units 12-24 operate in this circuit switch manner to establish point-to-point communication by first broadcasting a signal and establishing both at the receiver and at the original transmitter a selection of the appropriate receiving serial path.

The serial data as it is transmitted uses a serial data clock and this can be deliberately subject to jitter so as to spread and lower intensity at any given frequency of emissions associated with that serial data transmission. The serial data transmission will typically be of a very high frequency and accordingly such measures are advantageous.

Figure 2:
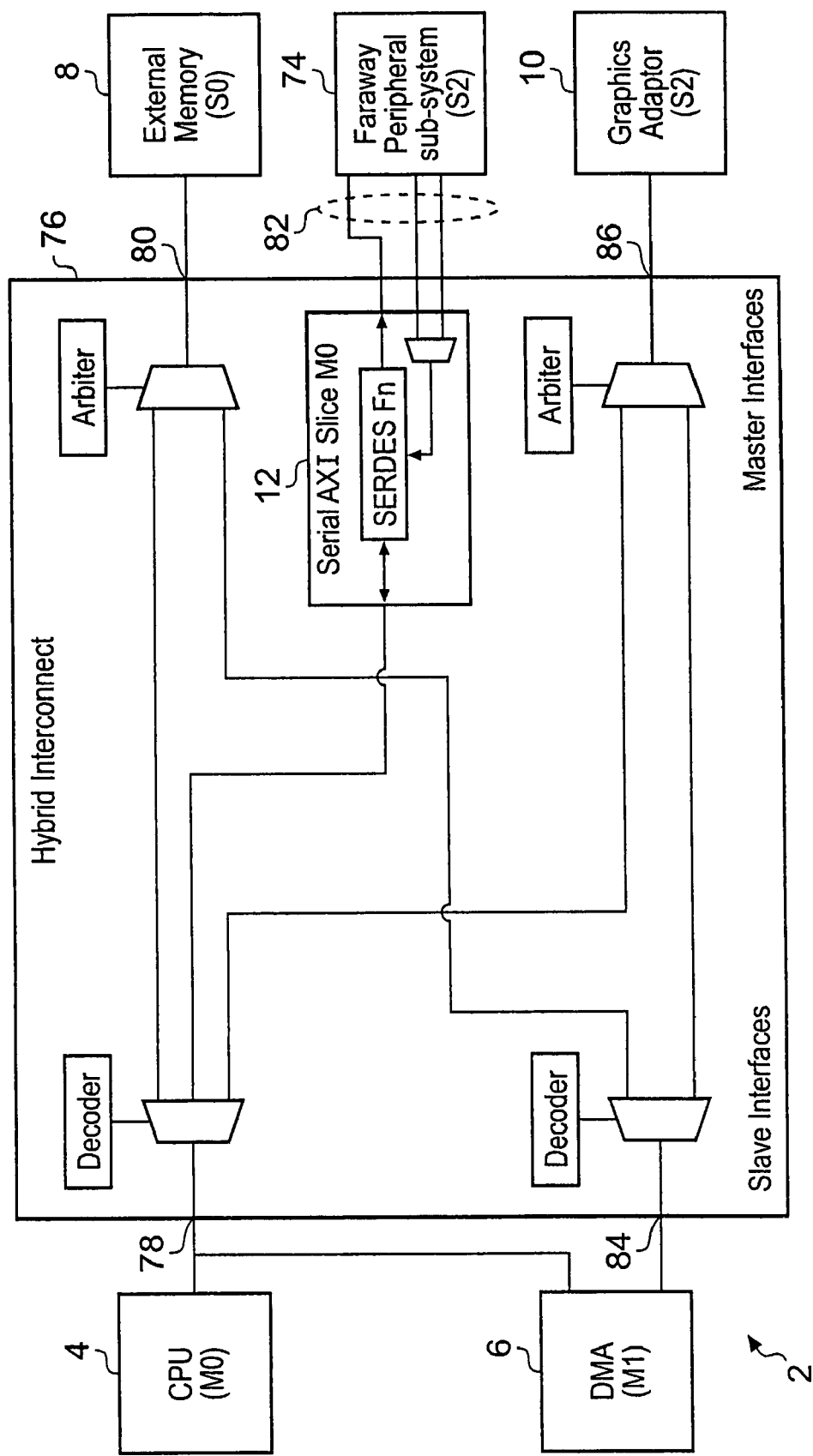
FIG. 2 schematically illustrates an integrated circuit comprising multiple devices connected via a co-existence of parallel and serial technologies in a hybrid interconnect.

FIG. 2 illustrates the ability of the technology described in this application to co-exist with the parallel form of the AXI interface, i.e. a single serial communication unit 12 is provided with other on-chip communication being via parallel AXI.

Figure 3:
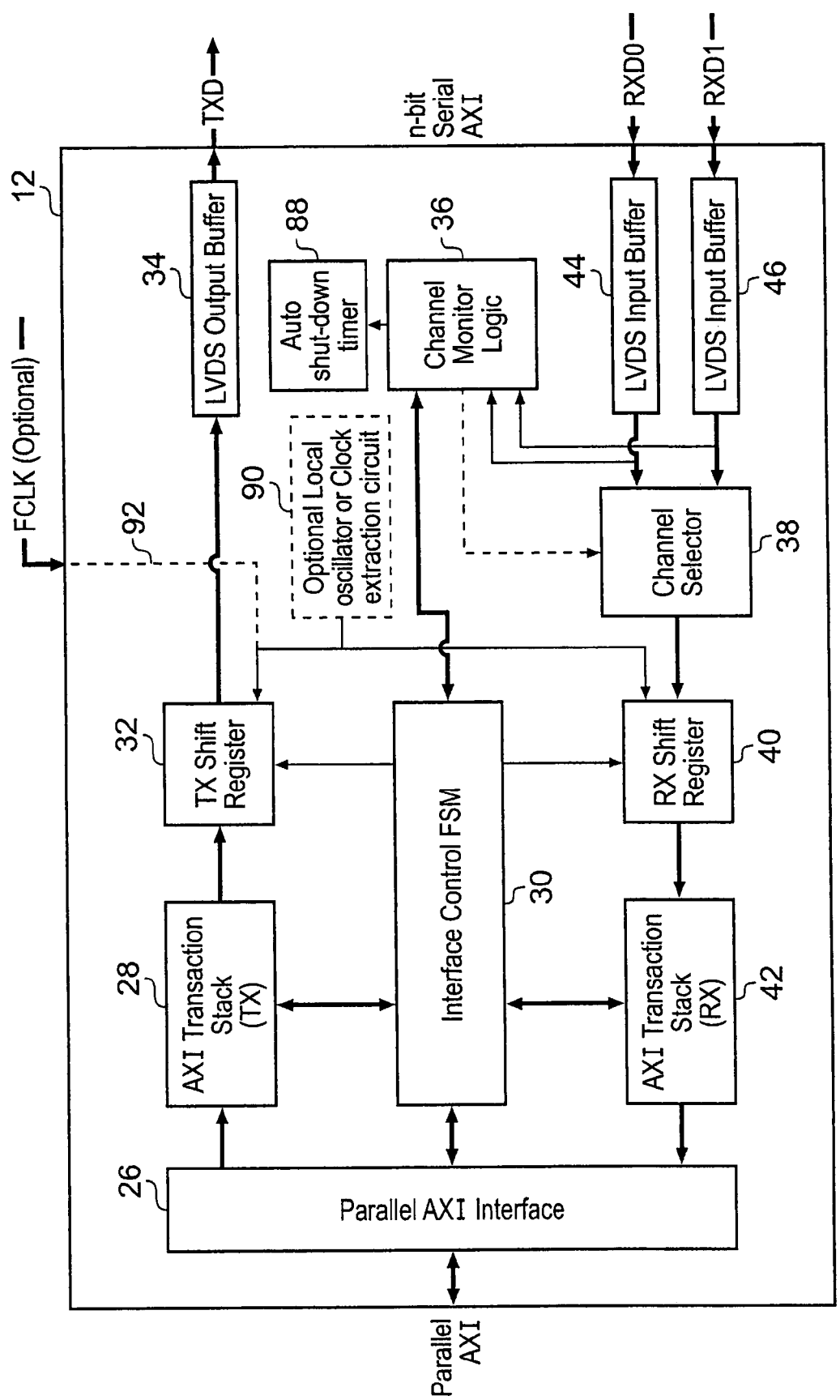
FIG. 3 illustrates a circuit including both a serialising circuit and a deserialising circuit in accordance with an example of the present techniques.

FIG. 3 illustrates a serial communication unit 12 in more detail and shows a configuration with two receiving channels. A parallel interface 26 both captures sets of parallel signals from a connected device (e.g. a CPU 4) and applies reformed sets of parallel signals back to that device. Captured sets of parallel signals are supplied to a transaction stack 28 where they are assembled together so that patterns within them maybe identified and represented by short codes before transmission. Also, the various parallel signals associated with a single transaction may not all arrive simultaneously at the parallel signal interface (e.g. see FIGS. 6 and 7 below) and accordingly might be captured at slightly different times and require buffering such that the entire transaction can be serialised together in away which can make its representation more efficient.

The patterns of parallel signals which might be identified and transmitted as short codes can vary, but typically include one or more transaction characterising control parameters such as a length of transaction, size of data word to be transmitted, a number of data values to be transmitted, a burst mode specifier, a destination base address tag and/or an offset from the catalogued address or an incremental address for the transaction to be transmitted. Once a destination address has been acknowledged and the point-to point communication switched into place, there maybe no reason to transmit the full address again, rather instead an offset within the destination region associated with the already selected destination device. The use of such an offset compresses the data to be transmitted.

The reformatting and encoding of the data buffered in the transaction stack 28 (e.g. using short codes, difference encoding, etc) is controlled by a finite state machine 30 as is a transmission shift register 32. The data to be serialised when encoded and compressed under the control of the finite state machine 30 is passed into the transmission shift register 32 from where it is output as a serial data stream on the transmission serial data signal line TXD via a low voltage differential output buffer 34. The parallel interface 26, the transaction stack 28, the finite state machine 30, the shift register 32 and the buffer 34 effectively provide the serialising circuit.

At the receiver serial data signals are received on either of two reception serial data lines RXD0 and RXD1. Since in the example of FIG. 1 there are two masters and two slaves, all of the reception inputs will have two signal lines, although if a different number of masters or slaves were present then this number would vary accordingly. When communication is first being established via receipt of an acknowledgment signal on the reception, channel monitoring logic 36 serves to recognise this acknowledgement signal being received and switch the multiplexer (channel selector) 38 accordingly. The multiplexer (channel selector) 38 once switched supplies the received serial data stream to a reception shift register 40 where it is captured before being passed into a reception transaction stack 42. Under control of the finite state machine 30, the reception transaction stack 42 serves to reform a set of parallel signals (e.g. decoding short codes, or difference signals when operating in a difference mode) which are then passed to the parallel interface 26 for application to the connected device.

As illustrated in FIG. 3, both the transmission shift register 32 and the reception shift register 40 are supplied with a fast clock signal, which may be provided by a local oscillator or clock extraction circuit 90 or provided by a global signal within the integrated circuit 92. The local oscillator can be synchronised using the techniques discussed above. The input buffers 44, 46, the select logic 36, the multiplexer (channel selector) 38, the reception shift register 40, the reception transaction stack 42 and the finite state machine 30 together with the parallel interface 26 function as the deserialising circuit to receive a serial data stream and convert this back into a set of parallel signals.

The auto shut-down timer 88 allows the power consumption of the serial communication unit to be reduced after a detected period of inactivity. It monitors the handshake signals and turns off the power to the non-vital circuitry, while staying responsive to a received signal from another device upon the serial data path to wake up and turn the power back on.

Figure 4:
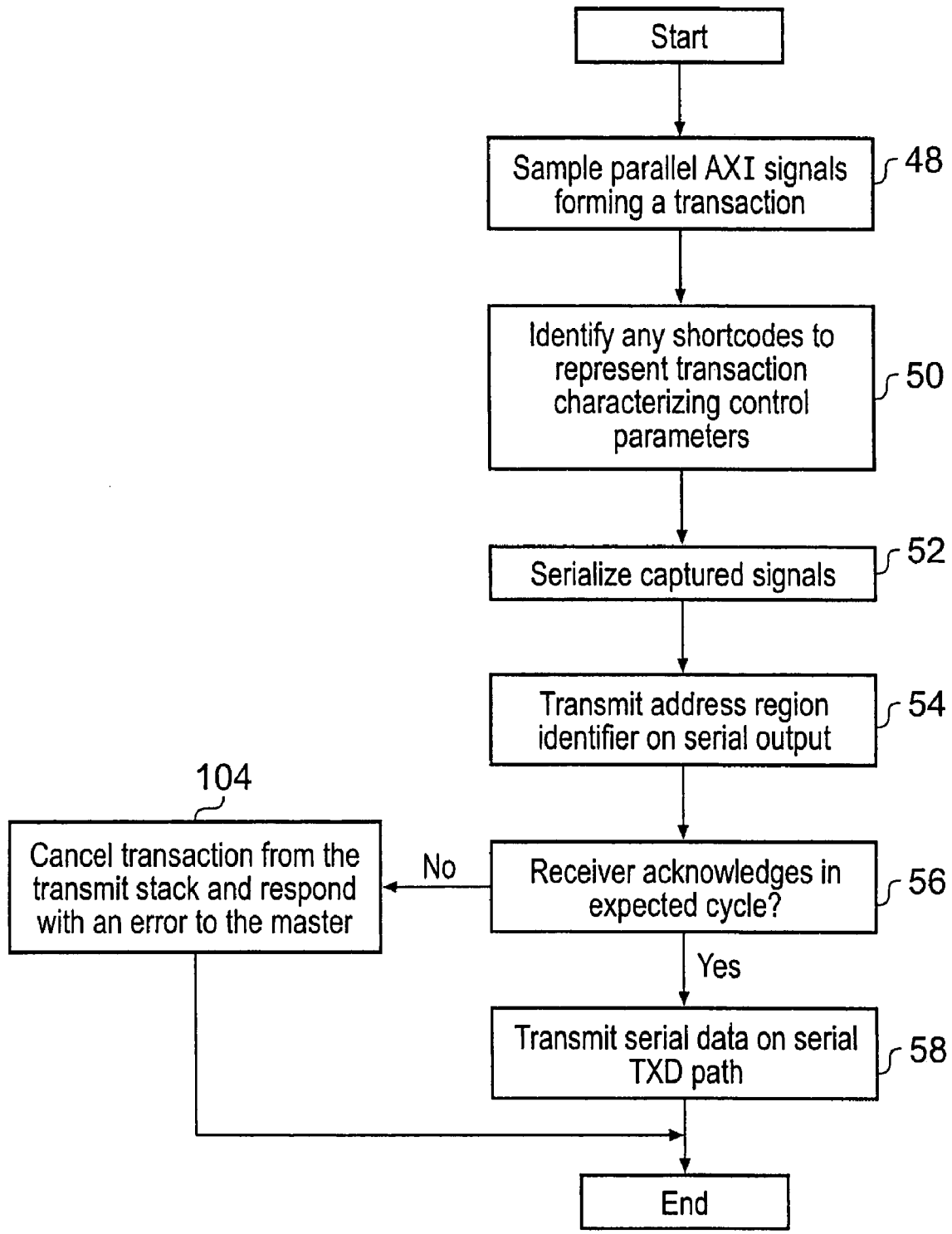
FIG. 4 is a flow diagram schematically illustrating the operations performed by a serialising circuit.

FIG. 4 schematically illustrates the operation performed by the serialising circuit. At step 48, parallel AXI signals are sampled. At step 50, any shortcodes which can represent a transaction characterising control parameter of the captured transaction are identified for use in place of the associated transaction characterising control parameter. At step 52, the captured signals and any shortcode values are serialised. At step 54, the transmitter issues an address region identifier which is broadcast on the serial output to all potential receivers. At step 56, the serialising circuit waits for one of the receivers to return an acknowledgment signal. If no signal is received during the acknowledge cycle, then the transaction is aborted from the transmission stack 28 with an address decode error response. The acknowledgement signal is used to control the multiplexer (channel selector) 38 to select the appropriate return signal path. For a successfully acknowledged address, step 58 then transmits the serial data for the transaction on the serial path now established as a point-to-point connection.

Figure 5:
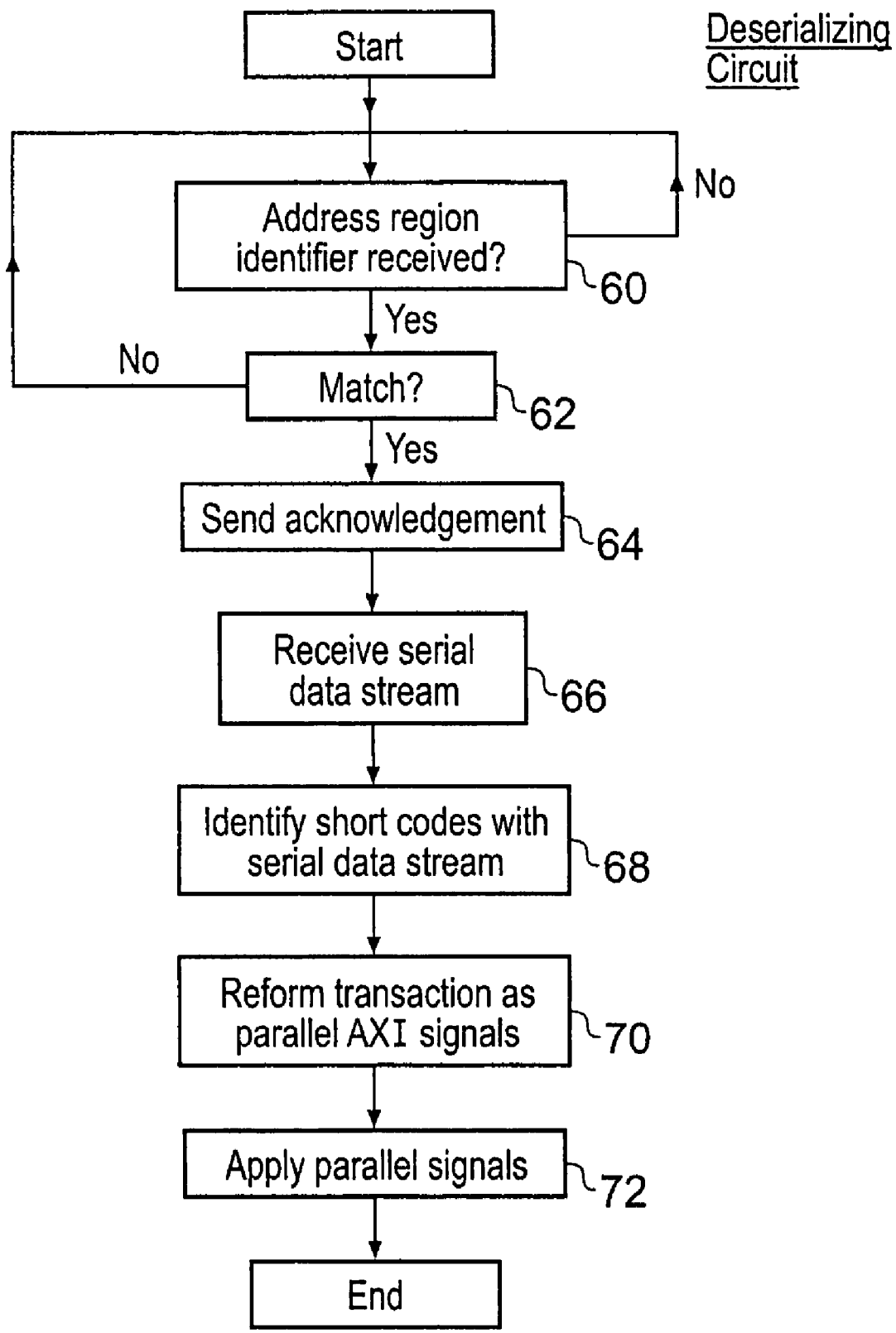
FIG. 5 is a flow diagram schematically illustrating the operations performed by a deserialising circuit.

FIG. 5 illustrates the operations performed by the deserialising circuit. At step 60, the deserialising circuit waits until address information is received. At step 62 a determination is made as to whether or not this matches an address region which is mapped to that deserialising circuit. If there is no match, then processing returns to step 60. If there is a match, then processing proceeds to step 64 where a return acknowledgement signal is issued, which may be the first bit of the RXD channel data for the current transaction. This establishes the point-to-point communication and subsequently at step 66 the serial data stream is received. Step 68 identifies any short codes within the serial data stream and uses these together with the raw serial data to reform the parallel AXI signal transaction at step 70. At step 72 the parallel signals are applied to the destination device.

FIG. 6 schematically illustrates a sequence of parallel signals presented at a parallel signal interface in accordance with the AXI parallel signal protocol and forming a write transaction. These signals are provided on a write address channel, a write data channel and slave's write response channel. The write address channel and the write data channel signals may be collected together within the transmission transactions stack 28 before being serialised.

FIG. 7 is a similar diagram illustrating a read transaction in which address information is sent out from the master on a read address channel followed by read data being returned by the slave via the read data channel.

Figure 8:
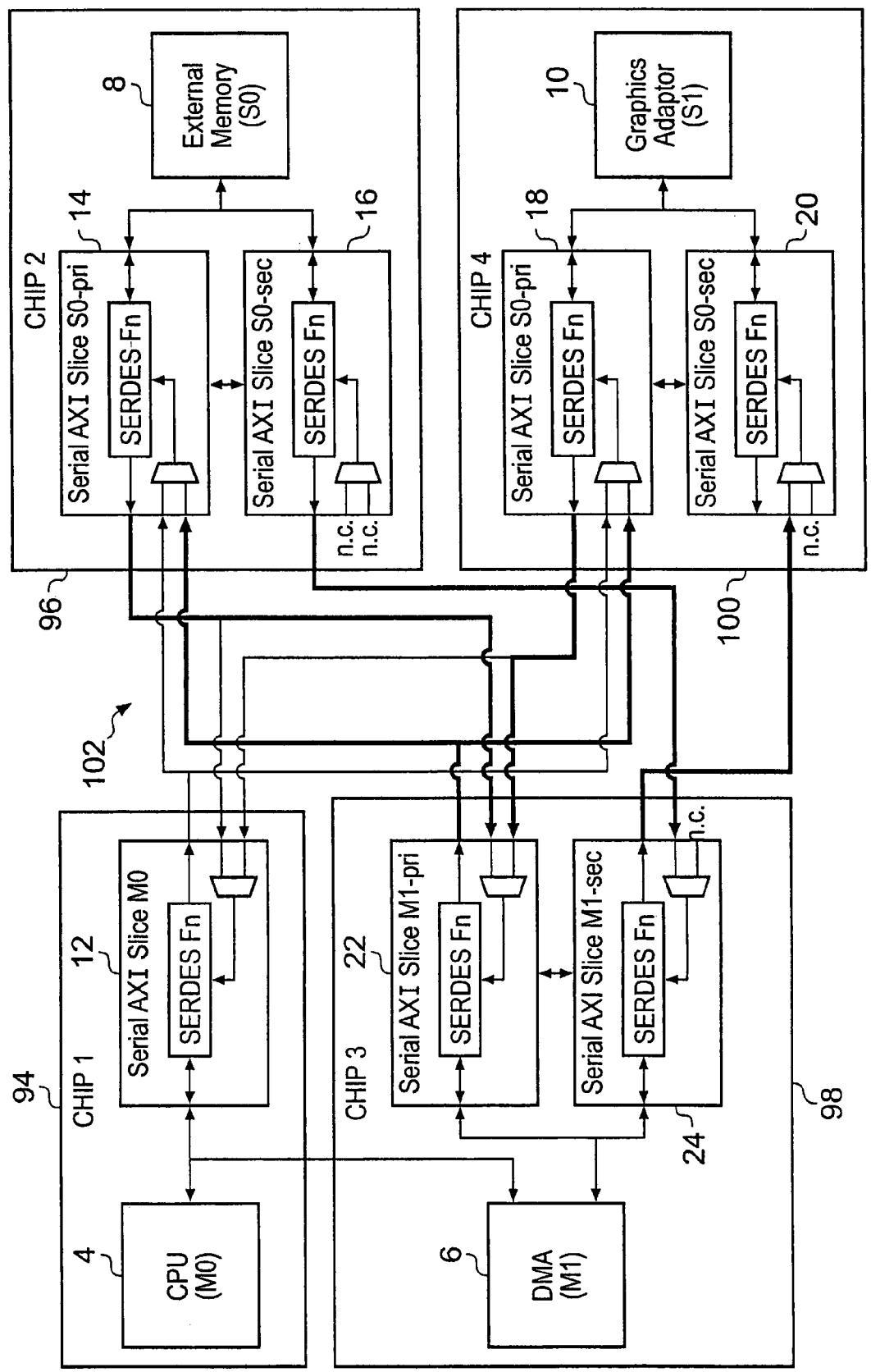
FIG. 8 illustrates the invention when used to provide an interconnect between a plurality of integrated circuits in the form of separately packaged entities.

FIG. 8 schematically illustrates how the technology described in this application might be used to perform an "off-chip" serial interconnect function.

Although illustrative example embodiments have been described in detail herein with reference to the accompanying drawings, it is to be understood that the claims are not limited to those embodiments, and that various changes and modifications can be effected therein by one skilled in the art without departing from the appended claims.

I claim:

1. Apparatus for processing data comprising:
   two or more devices each having parallel signal interface operating in accordance with a parallel signal protocol;
   an interconnect coupled to said two or more devices and operating to pass signals therebetween; wherein
   said interconnect comprises:
   a serializing circuit coupled to a parallel signal interface of a first device of said two or more devices and a serial data path and configured:
      (i) to sample from said parallel signal interface of said first device a first set of parallel signals forming a transaction in accordance with said parallel signal protocol;
      (ii) to serialize said first set of parallel signals to form a serial stream of data; and
      (iii) to transmit said stream of data via said serial data path; and
   a deserializing circuit coupled to a parallel signal interface of a second device of said two or more devices and said serial data path and configured:
      (i) to receive said serial stream of data from said serial data path;
      (ii) to deserialize said serial stream of data to form a second set of parallel signals corresponding to said first set of parallel signals; and
      (iii) to apply said second set of parallel signals to said parallel signal interface of said second device to reform said transaction in accordance with said parallel signal protocol,
   wherein:
   said serializing circuit is responsive to one or more predetermined patterns of values for signals of said first set of parallel signals to form one or more short codes representing said one or more predetermined patterns and to transmit said one or more short codes as part of said serial data stream in place of said one or more predetermined patterns, said serializing circuit transmitting said first set of parallel signals without use of said one or more short codes when said first set of parallel signals does not match any of said one more predetermined patterns; and
   said deserializing circuit is responsive to said one or more short codes within said serial data stream to form corresponding patterns of values of said second set of parallel signals.

2. Apparatus as claimed in claim 1, wherein each of said two or more devices has a serializing circuit and a deserializing circuit associated therewith.

3. Apparatus as claimed in claim 1, comprising at least three devices and wherein at least two of said three devices communicate therebetween via said serial data path and at least two of said three devices communicate therebetween directly using respective parallel signal interfaces and said parallel signal protocol.

4. Apparatus as claimed in claim 1, wherein said serial data path includes a plurality of serial data channels via which said serial stream of data is transmitted.

5. Apparatus as claimed in claim 1, wherein said second set of parallel signals match said first set of parallel signals.

6. Apparatus as claimed in claim 1, wherein said one or more short codes represent one or more transaction characterizing control parameters.

7. Apparatus as claimed in claim 6, wherein said one or more short codes represent one of more of:
   a length of transaction;
   a size of a data value to be transmitted;
   a number of data values to be transmitted;
   a burst mode specifier;
   a destination address region for a transaction to be transmitted;
   a destination base address tag;
   an offset from a catalogued address; and
   an incremental address for said transaction.

8. Apparatus as claimed in claim 1, wherein said serializing circuit and said deserializing circuit use Manchester encoding for said serial data stream.

9. Apparatus as claimed in claim 1, wherein said serializing circuit and said deserializing circuit comprise respective local oscillators subject to synchronization via said serial data stream.

10. Apparatus as claimed in claim 1, wherein said serializing circuit and said deserializing circuit are clocked from a shared global clock source.

11. Apparatus as claimed in claim 9, wherein parity bits within said serial data stream provide embedded synchronization points for said local oscillators.

12. Apparatus as claimed in claim 9, wherein modulation of said serial data stream provides said synchronization.

13. Apparatus as claimed in claim 1, wherein said serializing circuit and said deserializing circuit comprise respective buffer memories for buffering a plurality of transactions to be subject to serialization together as a packet of serial data representing said plurality of transactions.

14. Apparatus as claimed in claim 1, wherein said serializing circuit and said deserializing circuit have a difference mode in which said serial data stream represents a sequence of said first set of parallel signals by representing differences therebetween.

15. Apparatus as claimed in claim 1, wherein when operating in an asynchronously timed mode said serializing circuit and said deserializing circuit generate and exchange synchronisation signals so as to perform closed loop timing control.

16. Apparatus as claimed in claim 1, wherein said serializing circuit and said deserializing circuit generate and exchange handshake signals so as to establish said serial data path therebetween.

17. Apparatus as claimed in claimed 16, wherein said serializing circuit issues a signal indicative a destination address region of said transaction as a handshake signal seeking to establish said serial data path and said deserializing circuit issues an acknowledge signal back to said serializing circuit as a handshake signal establishing said serial data path if said destination address region is mapped to said deserializing circuit.

18. Apparatus as claimed in claimed 16, wherein if a target address of said transaction is not mapped, then said serializing circuit cancels said transaction when an acknowledgement signal is not received from said deserializing circuit.

19. Apparatus as claimed in claim 1, wherein at least one of said serializing circuit and said deserializing circuit comprises a power down controller responsive to a detected period of inactivity to power down said at least one of said serializing circuit and said deserializing circuit and responsive to a received signal from one of said two or more devices or upon said serial data path to power up said at least one of said serializing circuit and said deserializing circuit.

20. Apparatus as claimed in claim 1, wherein said serial data stream is transmitted by said serializing circuit in synchronism with a serial data rate clock and said serializing circuit applies a jitter to said serial data rate clock so as to spread Electromagnetic (EM) emissions to be of a lower intensity and over a greater frequency spectrum.

21. Apparatus as claimed in claim 1, wherein said two or more devices and said interconnect are formed on a common integrated circuit.

22. Apparatus as claimed in claim 1, wherein said interconnect connects devices formed in separate integrated circuits.

23. A method of operating an apparatus for processing data having two or more devices each having parallel signal interface operating in accordance with a parallel signal protocol and an interconnect coupled to said two or more devices and operating to pass signals therebetween, said method comprising the steps of:
   sampling from a parallel signal interface of a first device of said two or more devices a first set of parallel signals forming a transaction in accordance with said parallel signal protocol;
   serializing with a serializing circuit said first set of parallel signals to form a serial stream of data;
   transmitting said stream of data via a serial data path;
   receiving said serial stream of data from said serial data path;
   deserializing with a deserializing circuit said serial stream of data to form a second set of parallel signals corresponding to said first set of parallel signals;
   applying said second set of parallel signals to a parallel signal interface of a second device of said two or more devices to reform said transaction in accordance with said parallel signal protocol,
   wherein:
   said serializing circuit is responsive to one or more predetermined patterns of values for signals of said first set of parallel signals to form one or more short codes representing said one or more predetermined patterns and to transmit said one or more short codes as part of said serial data stream in place of said one or more predetermined patterns, said serializing circuit transmitting said first set of parallel signals without use of said one or more short codes when said first set of parallel signals does not match any of said one more predetermined patterns; and
   said deserializing circuit is responsive to said one or more short codes within said serial data stream to form corresponding patterns of values of said second set of parallel signals.

24. A method as claimed in claim 23, wherein each of said two or more devices has a serializing circuit and a deserializing circuit associated therewith.

25. A method as claimed in claim 23, comprising at least three devices and wherein at least two of said three devices communicate therebetween via said serial data path and at least two of said three devices communicate therebetween directly using respective parallel signal interfaces and said parallel signal protocol.

26. A method as claimed in claim 23, wherein said serial data path includes a plurality of serial data channels via which said serial stream of data is transmitted.

27. A method as claimed in claim 23, wherein said second set of parallel signals match said first set of parallel signals.

28. A method as claimed in claim 23, wherein said one or more short codes represent one or more transaction characterizing control parameters.

29. A method as claimed in claim 28, wherein said one or more short codes represent one of more of:
  a length of transaction;
  a size of a data value to be transmitted;
  a number of data values to be transmitted;
  a burst mode specifier;
  a destination address region for a transaction to be transmitted;
  a destination base address tag;
  an offset from a catalogued address; and
  an incremental address for said transaction.

30. A method as claimed in claim 23, wherein said serializing circuit and said deserializing circuit use Manchester encoding for said serial data stream.

31. A method as claimed in claim 23, wherein said serializing circuit and said deserializing circuit use respective local oscillators subject to synchronization via said serial data stream.

32. A method as claimed in claim 23, wherein said serializing circuit and said deserializing circuit are clocked from a shared global clock source.

33. A method as claimed in claim 31, wherein parity bits within said serial data stream provide embedded synchronization points for said local oscillators.

34. A method as claimed in claim 31, wherein modulation of said serial data stream provides said synchronization.

35. A method as claimed in claim 23, wherein said serializing circuit and said deserializing circuit use respective buffer memories for buffering a plurality of transactions to be subject to serialization together as a packet of serial data representing said plurality of transactions.

36. A method as claimed in claim 23, wherein said serializing circuit and said deserializing circuit have a difference mode in which said serial data stream represents a sequence of said first set of parallel signals by representing differences therebetween.

37. A method as claimed in claim 23, wherein when operating in an asynchronously timed mode said serializing circuit and said deserializing circuit generate and exchange synchronisation signals so as to perform closed loop timing control.

38. A method as claimed in claim 23, wherein said serializing circuit and said deserializing circuit generate and exchange handshake signals so as to establish said serial data path therebetween.

39. A method as claimed in claimed 38, wherein said serializing circuit issues a signal indicative a destination address region of said transaction as a handshake signal seeking to establish said serial data path and said deserializing circuit issues an acknowledge signal back to said serializing circuit as a handshake signal establishing said serial data path if said destination address region is mapped to said deserializing circuit.

40. A method as claimed in claim 38, wherein if a target address of said transaction is not mapped, then said serializing circuit cancels said transaction when an acknowledgement signal is not received from said deserializing circuit.

41. A method as claimed in claim 23, wherein at least one of said serializing circuit and said deserializing circuit comprises a power down controller responsive to a detected period of inactivity to power down said at least one of said serializing circuit and said deserializing circuit and responsive to a received signal from one of said two or more devices or upon said serial data path to power up said at least one of said serializing circuit and said deserializing circuit.

42. A method as claimed in claim 23, wherein said serial data stream is transmitted by said serializing circuit in synchronism with a serial data rate clock and said serializing circuit applies a jitter to said serial data rate clock so as to spread Electromagnetic (EM) emissions to be of a lower intensity and over a greater frequency spectrum.

43. A method as claimed in claim 23, wherein said two or more devices and said interconnect are formed on a common integrated circuit.

44. A method as claimed in claim 23, wherein said interconnect connects devices formed in separate integrated circuits.

* * * * *